US006285034B1

(12) United States Patent
Hanna et al.

(10) Patent No.: US 6,285,034 B1
(45) Date of Patent: *Sep. 4, 2001

(54) INSPECTION SYSTEM FOR FLANGED BOLTS

(76) Inventors: James L. Hanna, 2847 Quail Hollow St.; Donald R. Smith, 3181 Cardinal, both of Ann Arbor, MI (US) 48108

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,025

(22) Filed: Nov. 4, 1998

(51) Int. Cl.$^7$ .................................................. G01N 21/86
(52) U.S. Cl. ................... 250/559.2; 250/559.24; 356/638
(58) Field of Search ................ 250/559.29, 559.26, 250/559.24, 559.22, 559.2, 223 R, 559.39, 559.15; 356/385, 384, 383, 394, 386, 387, 376, 638, 634, 229, 237.2, 237.3

(56) References Cited

U.S. PATENT DOCUMENTS

| 4,260,260 | 4/1981 | Letort et al. | 356/385 |
|---|---|---|---|
| 4,532,723 | 8/1985 | Kellie et al. | 356/73 |
| 4,576,482 | 3/1986 | Pryor | 356/376 |
| 4,831,251 | * 5/1989 | Hanna | 250/223 R |
| 4,880,991 | 11/1989 | Boehnlein et al. | 250/559.24 |
| 4,914,307 | 4/1990 | Kanev | 250/559.12 |
| 4,978,223 | 12/1990 | Kutchenriter et al. | 356/384 |
| 4,991,308 | 2/1991 | Donaldson | 33/555.1 |
| 5,164,995 | 11/1992 | Brooks et al. | 382/152 |
| 5,383,021 | 1/1995 | Hanna | 356/383 |
| 5,408,325 | * 4/1995 | Cruickshank | 356/376 |
| 5,568,263 | 10/1996 | Hanna | 356/385 |
| 5,608,530 | 3/1997 | Gates | 356/384 |

FOREIGN PATENT DOCUMENTS 3633275   10/1987   (DE) .

* cited by examiner

Primary Examiner—Que T. Le
Assistant Examiner—Thanh X. Luu
(74) Attorney, Agent, or Firm—Brinks Hofer Gilson & Lione

(57) ABSTRACT

An inspection system for evaluating rotationally asymmetric workpieces for conformance to configuration criteria having a track for causing the workpieces to translate through a test section, the test section including a plurality of electromagnetic energy sources, the plurality of electromagnetic energy sources oriented with respect to the track means such that the workpieces occlude the plurality of electromagnetic energy sources upon passing through the test section, the test section further having electromagnetic energy detectors for receiving the electromagnetic energy to provide output signals related to the intensity of the occluded electromagnetic energy incident on the electromagnetic energy detectors, and a signal processing means for receiving said output signals.

14 Claims, 4 Drawing Sheets

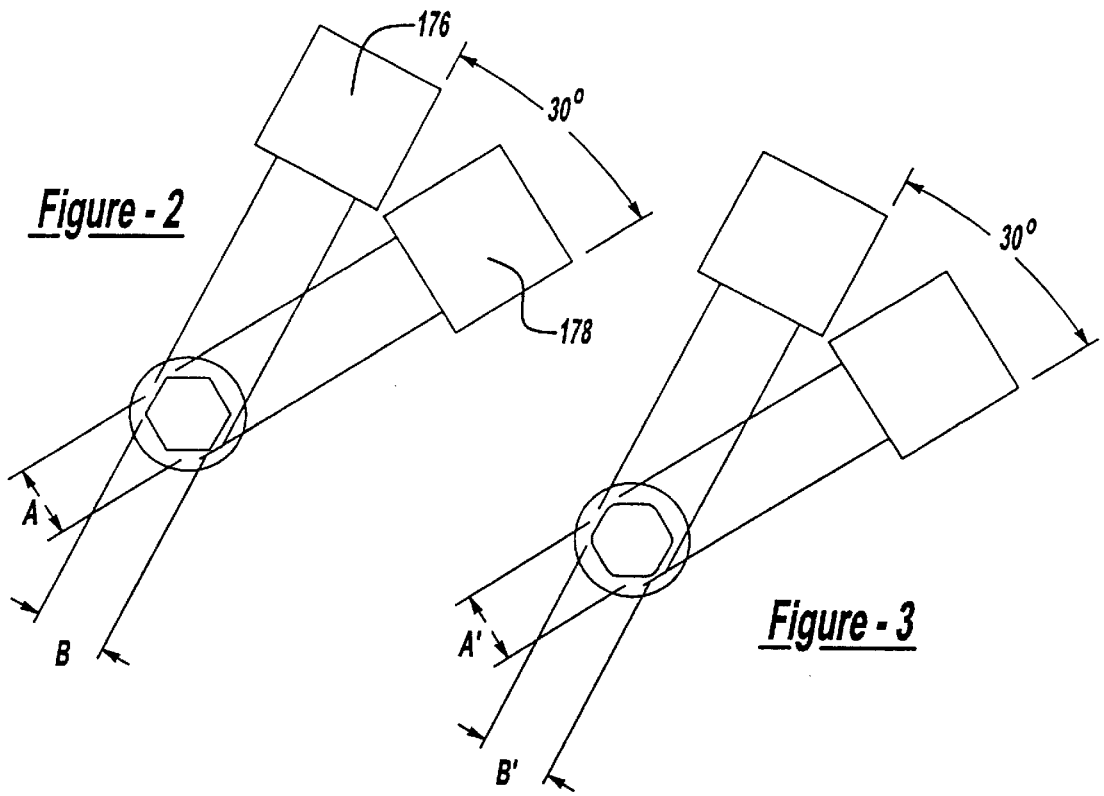
*Figure - 2*
*Figure - 3*
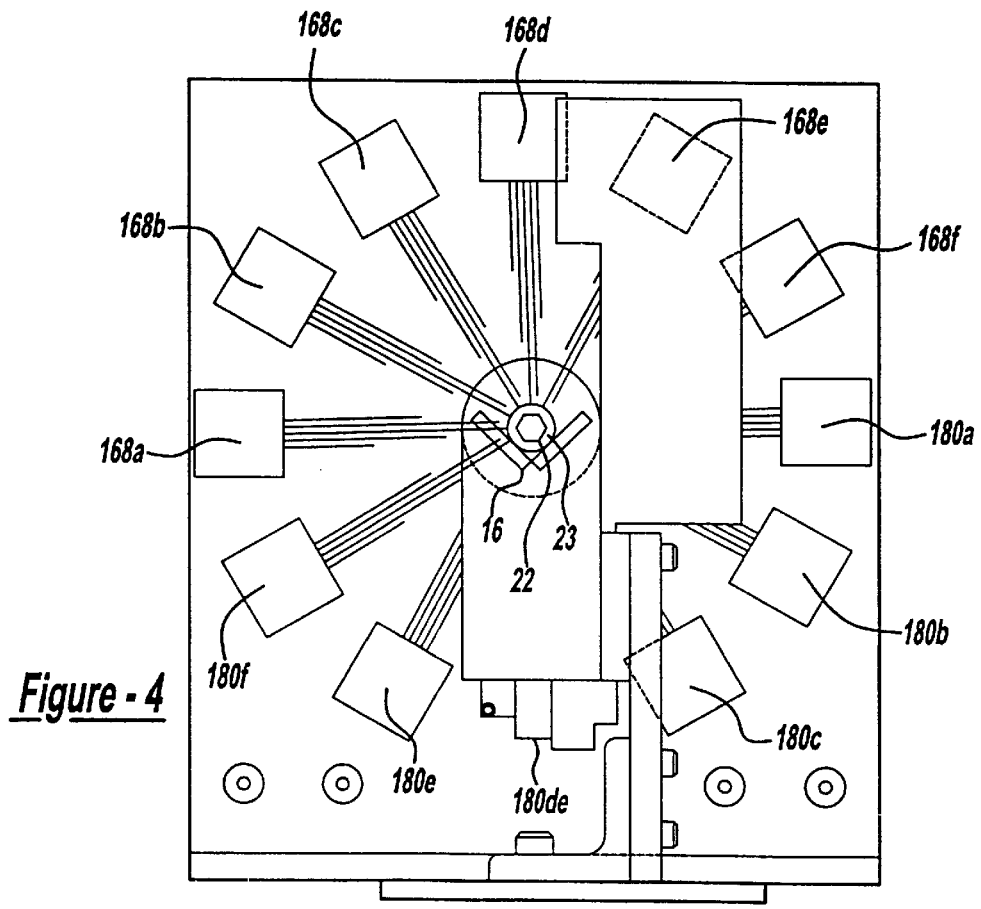
*Figure - 4*

INSPECTION SYSTEM FOR FLANGED BOLTS

BACKGROUND OF THE INVENTION

The present invention relates to a device for inspecting components and particularly to one using an array of light sources and photo-detection devices as a means of evaluating a fastener with a flanged or "washer-headed" configuration for conformance to spatial form criteria.

Presently, there is an ever increasing demand to obtain high quality products which has resulted in a significant increase in the use of non-contact inspection systems. In order for a complex machine to operate as designed, it is necessary that all of its sub-components comply with quality criteria. In some manufacturing settings, customers require 100% inspection of component parts. For example, flanged fasteners used in the automobile industry and elsewhere often must be individually inspected to determine if they meet spatial form criteria.

Numerous types of inspection systems are presently utilized. One type of system uses contact probes which touch a component at various points to determine if its dimension or profile meet certain criteria. However, contact devices have inherent limitations in that they are subject to wear and generally require that the component and the contact probe be accurately positioned during the evaluation process. Moreover, such devices are generally slow to operate and are limited in terms of the number of criteria and complexity of profiles which they can evaluate. A variety of non-contact systems are also known using a variety of techniques. For example, ultrasonic inspection systems examine reflected sound waves as a means of characterizing a component. Various systems based on photodetection utilizing single channel photodetectors are also known. In addition, laser gauging systems are used in which specific dimensional measurements can be obtained.

However, although non-contact inspection systems are known, there is a need in the art for a non-contact inspection system that can detect damage or defects for a hex headed flanged or "washer headed" bolt. If a hex-headed flange bolt is damaged across its corners and fails a minimum "across corners value" a wrench used to tighten the bolt will slip, leading to installed bolts lacking the required tightening torque. A hex-headed flanged bolt as it slides down a chute will be oriented in an unknown radial position because of it circular flange. A simple profile matching function cannot be used to detect damage to the hex-head as the bolts do not pass by the inspecting lasers in a known position. Non-contact gauging systems that exist today do not have the ability to examine damage to the corners of a hex-headed flange bolt in real time with a 100% part inspection. There is a need in the art for a noncontact gauging system for the inspection of hex headed flanged bolts.

SUMMARY OF THE INVENTION

In accordance with the present invention, an improved non-contact inspection system is provided which enables rapid inspection of hex headed flanged or "washer headed" bolts to be conducted permitting the bolts to immediately be sorted in terms of being in conformance or out of conformance with spatial form criteria. For example, for a hex headed flanged bolt, the "across corner values" can be evaluated and the conforming parts can be channeled to a bin separate from that of the nonconforming parts.

When producing fasteners, the process often begins with wire stock which is fed into a cold heading or screw type forming machine. The part is die-formed or cut in a machine into a shape that may include several diameters and possibly a threaded or knurled length. The formed part may require secondary operations such as thread rolling, heat treating, planing, stamping etc. It is not uncommon for one or more of the processes to fail to produce the desired geometry of part. Specifically, the hex head stamped onto the fastener may be distorted and twisted by the stamping process. The occurrence of such defects is often not adequately monitored through random part selection or other quality assurance processes which do not provide a 100% inspection.

In the present invention parts move by gravity or other means along a track through a test section. The part shape is determined through the use of an array of lasers or other light sources and photodetection devices such as CCD in line pixel arrays or single channel photodetectors, but is not limited to such approaches. The array of lasers is mounted in radial fashion about a track in which the parts slide down. As a part slides down the track it will occlude the light generated from the array of lasers. The photodetection devices will measure the occluded light and generate output signals to a signal processor. From these output signals the conformity of the hex head may be determined through the use of a novel method which does not require that the flanged hex bolt slide down the track in a fixed radial position.

Further objects, features, and advantages of the invention will become apparent from a consideration of the following description and the appended claims when taken in connection with the accompanying drawings.

BRIEF DESCRIPTION OF THE DRAWINGS

FIGS. 2 and 3 are diagrammatic drawings illustrating the photodetection method of the present invention;

FIG. 4 is a view taken along line 3-3 of FIG. 1 particularly showing the test section and its array of light sources and photodetection devices;

DETAILED DESCRIPTION OF THE PREFERRED EMBODIMENT

Figure 1:
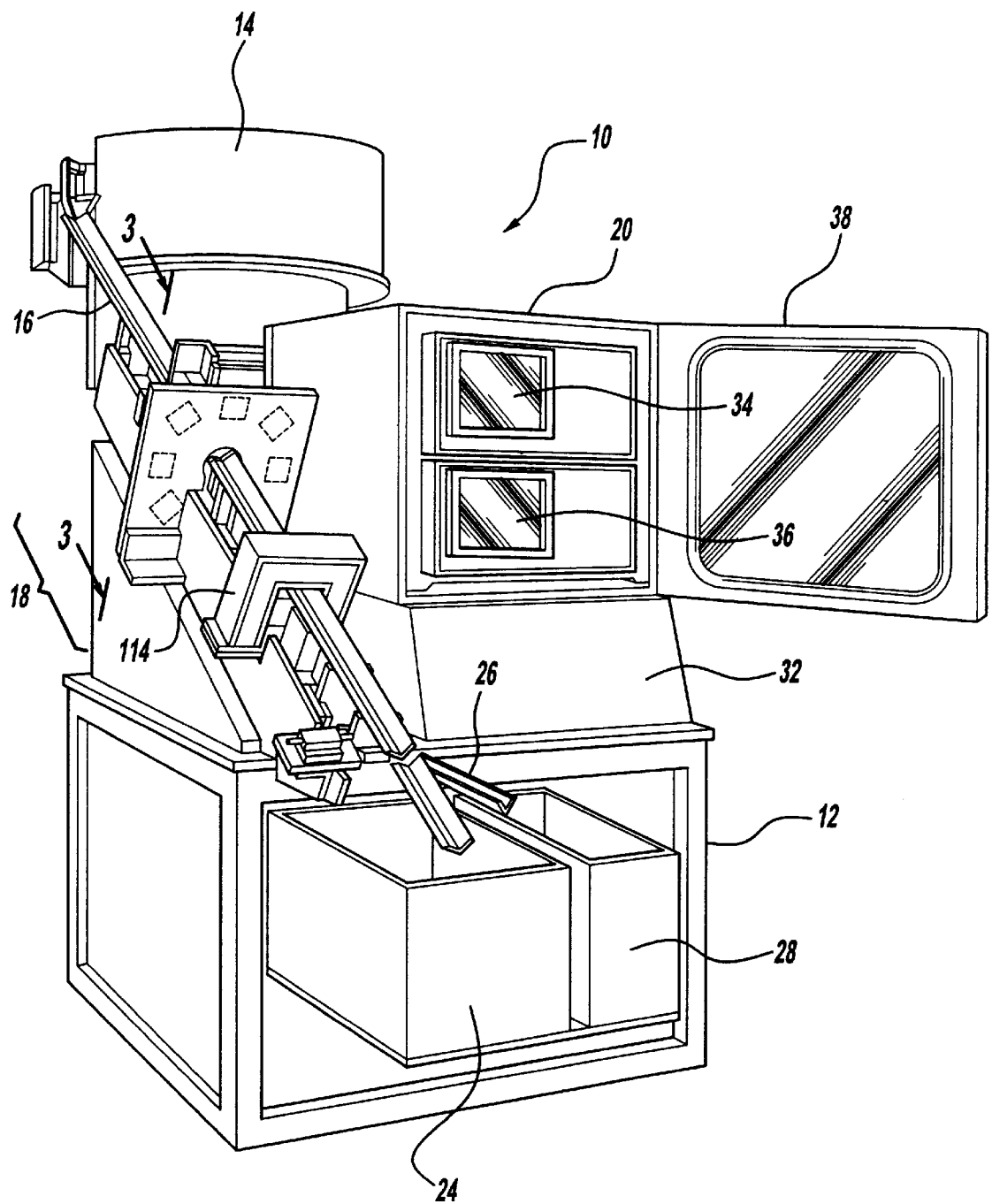
FIG. 1 is a pictorial view of the non-contact inspection system according to the present invention.

FIG. 1 shows a non-contact inspection system in accordance with the present invention and is generally shown as 10. The inspection system 10 comprises frame 12, parts sorter 14, slide track 16 having test section 18, and enclosure 20 for housing electronic components of the instrument.

Figure 5A:
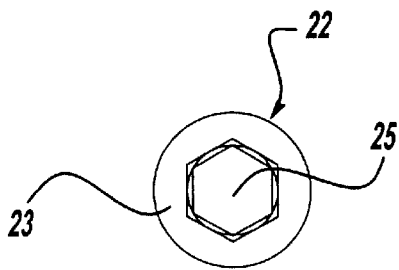
FIGS. 5a–5c are views of a representative workpiece for evaluation.
Figure 5B:
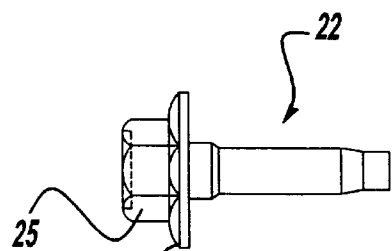
Figure 5C:
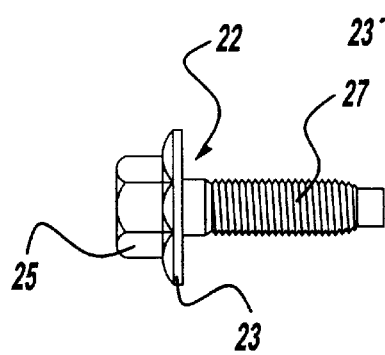

While inspection system 10 can be used for numerous types of workpieces, such as square head flange bolt, external torx$^{TM}$, flats on a shaft, and external splines. An example of one such component is provided in FIGS. 5a–5c in the form of a hex headed flanged or "washer headed" bolt 22. The bolt 22 includes a flange 23, a hex head 25, and may include a threaded end 27. The hex head 25 must have a particular shape or "across corners value" to comply with certain quality standards. If the hex head 25 fails a minimum "across corners value", a wrench used to tighten the bolt may slip leading to installed bolts lacking the required tightening torque.

A large number of the bolts 22 (also referred to as "parts" or "work-pieces") are dumped into part sorter bin 14. Part sorter bin 14 causes the randomly oriented bolts 22 to be directed in a desired orientation i.e. headed or threaded end first, and causes them to periodically slide down track 16 under the force of gravity. As bolts 22 pass through test section 18, they are evaluated as will be described in more detail in the following portions of this specification. The bolts 22 are inspected for conformance with predetermined spatial form criteria. If a particular part meets the criteria, it passes into parts bin 24 provided for qualified or "good" parts. If, however, the part is deemed to be out of conformance, gate 26 is actuated and the part is diverted into parts bin 28 provided for disqualified or "bad" parts. Presumably, good parts will outnumber bad parts and the parts bins are sized accordingly.

Within enclosure 20 is housed computer 32 provided for evaluating the outputs of the system, controlling the system, and providing a means of storing data related to part criteria and inspection history. A pair of displays 34 and 36 is provided, one of which may output in graphical form configuration data for a particular part, whereas the other may be used for outputting statistical or other numerical data related to inspection. In a prototype embodiment of this invention, displays 34 and 36 were electroluminescent types having touch screens for interaction with the user. Enclosure 20 has access doors 38 which can be closed when the system is not in use.

Details of the elements and operations of test section 18 will be described with reference to FIGS. 2, 3 and 4. Within test section 18, evaluations of bolts 22 are provided. The length of the part (i.e. its dimensions along its direction of travel) and various radial profiles (i.e. its form perpendicular to its direction of travel) is evaluated by a plurality of photodetection arrays consisting of laser light generators 168a–168f and photodetection devices 180a–180f. Each laser light generator 168 is matched to a corresponding photodetection device 180 to detect the occluded light from its matched laser light generator 168. In the preferred embodiment the laser light generators 168 and photodetection devices 180 are spaced radially about the test track 16 at 30° intervals. Although lasers have been detailed with some particularity, it will be understood that any coherent or non-coherent light source can be used with the present invention. All such light sources are therefore considered to be equivalents of the disclosed lasers, so long as the above general operating parameters are met.

The photodetection devices may comprise any apparatus capable of sensing light, but the preferred embodiment utilizes a CCD in line pixel array. The CCD in line pixel array is an electronic imaging device which contains a linear row of discrete photo sensing elements or pixels which convert incident light into an electrical signal. The strength of the signal is directly related to the intensity of light striking the pixels. The CCD in line pixel array generates an output signal composed of a plurality of digital and analog signals. Each pixel when saturated by light can function as an "on" condition or when fully blocked can function as an "off" condition. There are also circumstances when certain pixels may be only partially blocked. During these periods, the pixels can generate analog signals proportional to the amount of light they are receiving. The CCD in line array converts the incident light on each pixel into discrete charge packets. The amount of charge generated or integrated onto each pixel is a function of the integration time, and the intensity and wavelength of the light focused on the photocell. After an appropriate integration period, the charge packets are transferred simultaneously into high speed CCD shift registers to be transferred to a signal processing device where the charge packets levels may also be converted to digital information. This digital information may be used for a gray scale output or processed by software for edge detection.

CCD in line arrays can operate with data ranges at very high speeds and produce many scans per second. The data is also available immediately whereas a particular line from an area sensor is only available after the lines preceding it have been read out. Furthermore, in a CCD in line array the lines are sequential and are available one right after another. This makes CCD in line arrays ideally suited for applications where motion is present. Typically in the present invention, a CCD in line array is placed so as to align the row of pixels perpendicular to the direction of motion. That makes resolution in the direction of motion dependent on integration time, pixel size and the motion velocity. In the present invention the CCD in line array can be adjusted to suit the application.

The CCD in line array possesses excellent uniformity. Since a line scan camera contains a single row of pixels, the uniformity can be held much tighter than in an area array with several hundred thousand pixels. In the present invention high precision imaging applications, contrast correction hardware, and software algorithms are more easily implemented over a single line of pixels. Another valuable property of the CCD in line array is that an infinitely long or continuous picture can be generated. In effect, that is what a continuously moving conveyor belt or other continuous feed system presents to the camera. The CCD in line array will not chop off images as an area camera would need to in order to examine data.

Figure 6:
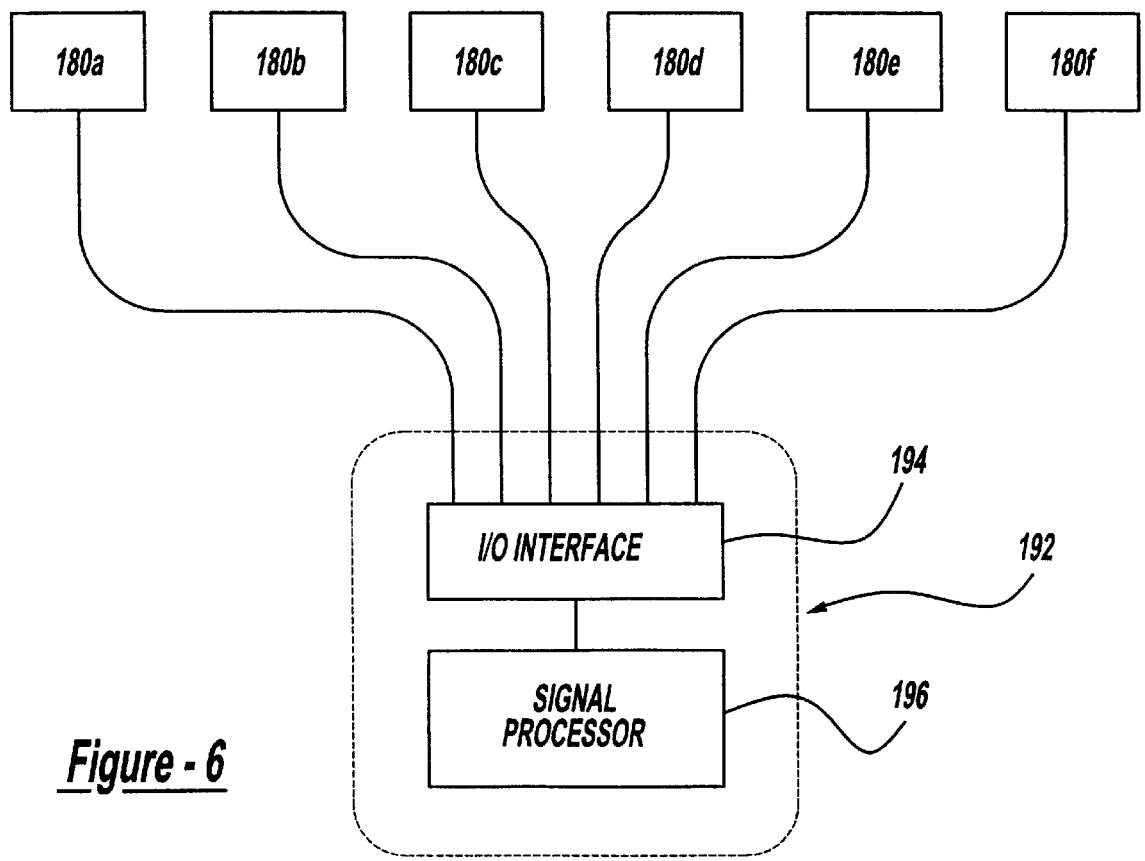
FIG. 6 is a schematic diagram of the photodetectors, I/O interface, and signal processing system of the present invention.

As seen in FIG. 6, once the photodetection devices 180 have sampled the image they must transfer their output signals via an I/O interface 194 to a signal processor 196 located in a computer 192. The present invention is preferably integrated with an Intel based personal computer although other computers including but not limited to Sun workstations, Hewlett Packard workstations, Silicon Graphics workstations, Macintosh computers, IBM workstations, Motorola microprocessor based PC's, programmable logic controllers, and other controllers may be used. The computer 192 displays the configuration information of the part shape and executes various control functions such as rejecting or accepting the part.

Referring again to FIGS. 2, 3 and 4, in operation the present invention uses each of the matched laser 168 - photodetection device 180 pairs to predict what its adjacent laser 168 - photodetection pair 180 should read after a bolt 22 has passed through the test section 18. The matched laser-photodetector pairs have a known position relative to each other, in the present embodiment they are 30° apart, and known acceptable hex head geometry. When one laser-photodetection pair reads a real diameter (rdia) a predicted value can be stated using the following math equation:

$$PV = (AC)\sin(30 - \arcsin(rdia/AC))$$

where:
AC = distance that should be across corners
PV = predicted value
rdia = measured distance of the selected laser
This function first finds the angle at which a corner is rotated using the inverse sine function ($\arcsin(rdia/AC)$).

This angle is subtracted from 30° (thereby pointing to the next laser). The sine of this new angle is then multiplied by the "lacross corners" value to arrive at the predicted value for that laser. The difference is then compared between what was actually read and what was predicted. The greater the variance between these values the more likely it is that the examined part is bad.

The following tables in combination with FIGS. 2 and 3 help to illustrate the method. The distances B, and B' constitute the rdia measurements. The first table shows a part that has the flats of the hex aligned with the lasers and the second example shows a part that was scanned at a random angle with the results in inches. The difference value is the absolute value of the difference between the actual and predicted values. The actual values and predicted values correspond to the actual and predicted "across corners values."

|  | Photo-Detector 180a | Photo-Detector 180b | Photo-Detector 180c | Photo-Detector 180d | Photo-Detector 180e | Photo-Detector 180f |
|---|---|---|---|---|---|---|
| ALIGNED SCAN | | | | | | |
| GOOD PART | | | | | | |
| Actual Values | .347 | .311 | .347 | .311 | .346 | .312 |
| Predicted Values | .347 | .313 | .347 | .309 | .347 | .318 |
| Difference | .000 | .002 | .000 | .002 | .001 | .006 |
| BAD PART | | | | | | |
| Actual Values | .313 | .313 | .312 | .313 | .314 | .316 |
| Predicted Values | .347 | .347 | .347 | .347 | .347 | .346 |
| Difference | .034 | .034 | .035 | .034 | .033 | .030 |
| RANDOM SCAN | | | | | | |
| GOOD PART | | | | | | |
| Actual Values | .327 | .341 | .327 | .342 | .328 | .342 |
| Predicted Values | .328 | .342 | .330 | .342 | .328 | .342 |
| Difference | .001 | .001 | .000 | .000 | .000 | .000 |
| BAD PART | | | | | | |
| Actual Values | .326 | .313 | .324 | .311 | .324 | .314 |
| Predicted Values | .346 | .343 | .347 | .343 | .347 | .343 |
| Difference | .020 | .030 | .023 | .032 | .023 | .030 |

As can be seen from these tables the present invention has the ability to determine the conformity of a part regardless of its radial position as it slides through the test section 18. In the preferred embodiment the readings are taken from the matched laser-photodetector pairs nearly simultaneously. This is preferred because the radial position of the part will then be a constant for all the readings that are taken. While it is possible that the readings may be taken consecutively, any radial motion of the part may introduce faults in the readings.

The pseudo code for this procedure for sampling the part shape and determining the conformity of the part is as follows:
begin loop
  1. read the current laser value
  2. find the angle for this laser
  3. predict the reading for the next laser
  4. read the value for the next laser
  5. compute the difference between the predicted and real value
  6. point to the next laser
  7. if difference is not within conformity
    then
      part is bad
    else
      part is good
  8. return to the beginning of loop.

Figure 7:
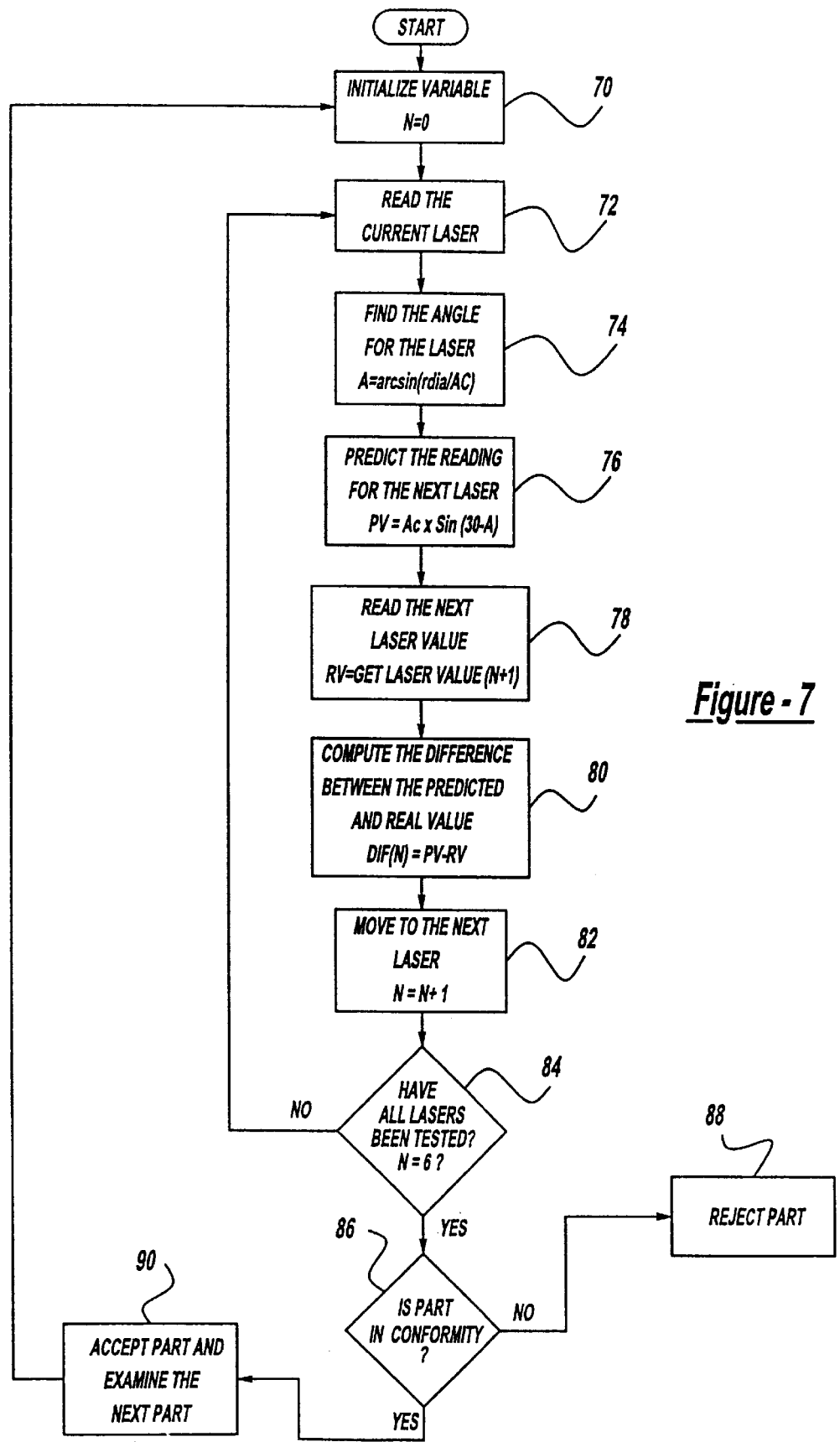
FIG. 7 is a flowchart showing the procedure for sampling workpieces for conformance to a configuration criteria.

FIG. 7 is a flow chart illustrating the procedure the present invention conducts in examining the flanged parts for conformity. Block 70 initializes the variables and begins sampling at the first laser (N=O). The current laser is read by its matching photodetection device at block 72. The angle at which the a laser is read for the across corners value is calculated using the equation:

$$A = \arcsin(rdia/AC)$$

where:
  A = angle at which a laser reads the across corner value
  rdia = real diameter read from laser
  AC = across corners values (constant)

Using the calculated A value, a prediction value is calculated by block 76 using the equation:

$$PV = (AC)\sin(30-A)$$

where:
  PV = the predicted value for the next laser
  AC = across corners value (a constant)
  A = angle in degrees at which a laser reads the across corners value The actual value of the adjacent laser is then read at step 78 and the difference between the real value and predicted value is calculated;

$$D = PV - RV$$

Where:
  D = difference
  PV = predicted value for adjacent laser
  RV = real or actual value from the next laser.

This process will then continue until the entire array of laser has been sampled. The array of difference values generated will then be compared to a conformance criteria at step 86 and the part will either be rejected or accepted. This process will continue for each part that enters the test section 18 of the present invention.

It is to be understood that the invention is not limited to the exact construction illustrated and described above, but that various changes and modifications may be made without departing from the spirit and scope of the invention as defined in the following claims.

What is claimed is:

1. A method of inspecting a flanged hex headed component for conformance to a configuration criterion, the method comprising:

a) sensing a plurality of radially spaced dimensions of the flanged hex headed component using a plurality electromagnetic energy source and electromagnetic energy detector pairs;

b) reading a first dimension of the flanged hex headed component measured by one of the plurality electromagnetic energy source and electromagnetic energy detector pairs;

c) predicting a second dimension measured by another of the electromagnetic energy source and electromagnetic energy detector pairs using the first dimension and a known location of the other electromagnetic energy source and electromagnetic energy detector pairs relative to the one of the plurality electromagnetic energy source and electromagnetic energy detector pairs;

d) comparing the predicted second dimension with an actual second dimension measured by the other of the electromagnetic energy source and electromagnetic energy detector pairs;

e) determining whether the flanged hex headed component is in conformance with the configuration criterion based on a difference between the predicted second dimension and the actual second dimension measured by the other of the electromagnetic energy source and electromagnetic energy detector pairs; and f) repeating (b) through (e) for each of the electromagnetic energy source and electromagnetic energy detector pairs to determine conformance of the plurality of radially spaced dimensions of the flanged hex headed component to the configuration criterion.

2. The method of claim 1, wherein predicting a second dimension further comprises calculating the predicted second dimension using a prediction equation having a relationship of:

$$PV=(AC) \sin (30°-\arcsin(rdia/AC))$$

Wherein:

PV=the predicted second dimension of flanged hex headed component;

AC=a known across corner dimension of the flanged hex headed component; and rdia=the measured first dimension of flanged hex headed component.

3. The method of claim 1, wherein said plurality of electromagnetic energy source and electromagnetic energy detector pairs are oriented in radial fashion about the flanged hex headed component and each of the pairs are spaced at thirty degrees from at least one adjacent pair.

4. The method of claim 1, wherein the electromagnetic energy detectors are charge coupled devices.

5. The method of claim 4, wherein said charge coupled devices are an in-line pixel array.

6. The method of claim 1 wherein the configuration criterion further comprises a plurality of dimensions defining a symmetrical hex shaped bolt head.

7. The method of claim 1 further comprising rejecting the flanged hex headed component based on a difference in value of the predicted second dimension and the measured actual second dimension.

8. A computer readable storage medium having instructions stored thereon that are executable by a controller to perform a method of inspecting a flanged hex headed component for conformance to a configuration criterion, wherein the controller is part of an inspection system having a track means for transporting the flanged hex headed component, a test section having a plurality electromagnetic energy source and electromagnetic energy detector pairs oriented with respect to said track means such that said components occlude electromagnetic energy upon passing through said test section, and wherein the electromagnetic energy detectors receive the electromagnetic energy not occluded by the components to provide output signals related to intensity of the electromagnetic energy incident on said electromagnetic energy detectors, the medium comprising:

a) instructions for sensing a plurality of radially spaced dimensions of the flanged hex headed component using the plurality electromagnetic energy source and electromagnetic energy detector pairs;

b) instructions for reading a first dimension of the flanged hex headed component measured by one of the plurality electromagnetic energy source and electromagnetic energy detector pairs;

c) instructions for predicting a second dimension measured by another of the electromagnetic energy source and electromagnetic energy detector pairs using the first dimension and a known location of another of the electromagnetic energy source and electromagnetic energy detector pairs relative to the one of the plurality electromagnetic energy source and electromagnetic energy detector pairs;

d) instructions for comparing the predicted second dimension with an actual second dimension measured by the other of the electromagnetic energy source and electromagnetic energy detector pairs;

e) instructions for determining whether the flanged hex headed component is in conformance with the configuration criterion based on a difference between the predicted second dimension and the actual second dimension measured by the other of the electromagnetic energy source and electromagnetic energy detector pairs; and f) instructions for repeating instructions (b) through (e) for each of the electromagnetic energy source and electromagnetic energy detector pairs to determine conformance the plurality of radially spaced dimensions of the flanged hex headed component to the configuration criterion.

9. The computer readable storage medium of claim 8, wherein instructions for predicting a second dimension further comprises calculating the predicted second dimension using a prediction equation having a relationship of:

$$PV=(AC) \sin (30°-\arcsin(rdia/AC))$$

Wherein:

PV=the predicted second dimension of the flanged hex headed component;

AC=a known across corner dimension of the flanged hex headed component; and rdia=the measured first dimension of the flanged hex headed component.

10. The computer readable storage medium of claim 8, wherein said plurality of electromagnetic energy source and electromagnetic energy detector pairs are oriented in a radial fashion about the flanged hex headed component and each of the pairs are spaced at thirty degrees from at least one other adjacent pair.

11. The computer readable storage medium of claim 8, wherein the electromagnetic energy detectors are charge coupled devices.

12. The computer readable storage medium of claim 11, where in said charge coupled devices are in-line pixel arrays.

13. The computer readable storage medium of claim 8 wherein the configuration criterion further comprises a plurality of dimensions defining a symmetrical hex shaped bolt head.

14. The computer readable storage medium of claim 8 further comprising instructions for rejecting the flanged hex headed component based on a difference in value of the predicted second dimension and the measured actual second dimension.

* * * * *